United States Patent [19]

Butculescu

[11] 4,117,744
[45] Oct. 3, 1978

[54] TRANSMISSION FOR CRAWLER TRACTORS

[75] Inventor: Michael Butculescu, Offenbach am Main, Fed. Rep. of Germany

[73] Assignee: Deere & Company, Moline, Ill.

[21] Appl. No.: 756,661

[22] Filed: Jan. 4, 1977

[30] Foreign Application Priority Data

Jan. 14, 1976 [DE] Fed. Rep. of Germany ....... 2601113

[51] Int. Cl.² ............................................. F16H 37/06
[52] U.S. Cl. .................................. 74/665 G; 74/356;
74/705
[58] Field of Search ................. 74/356, 359, 360, 705, 74/710.5, 720.5, 331, 378, , 665 G, 665 GA, 718; 192/49

[56] References Cited

U.S. PATENT DOCUMENTS

| 2,377,354 | 6/1945 | Merritt | 74/705 X |
| 3,405,574 | 10/1968 | Livezey | 74/705 X |

*Primary Examiner*—Samuel Scott
*Assistant Examiner*—Frank H. McKenzie, Jr.

[57] ABSTRACT

A transmission for a crawler tractor includes a first cross-drive shaft arrangement including two separate sections with a forward/reverse bevel gear arrangement connecting the two sections to a drive input shaft so that each shaft section is capable of being driven in forward or reverse. A second cross shaft arrangement is connected to the first cross shaft arrangement by constant-mesh spur gears and a third cross shaft arrangement is connected to the second cross shaft arrangement by further sets of constant-mesh spur gears. The second and third cross shaft arrangements are separated into shaft sections and the spur gearing and connections between shaft sections may be controlled such that Low and High working ranges may be effected in the transmission with first and second speeds being possible in the Low range, third and fourth speeds being possible in the High range and with a reduction being possible in each of the Low and High ranges. The transmission is further controllable for driving the opposite tracks of a crawler tractor in either forward or reverse at the four speeds, or for turning the tractor either by pivot-turning (power on the outer track), or by power-turning (power on both tracks but at different speeds) or by spin-turning (power on both tracks at the same speed but is opposite directions).

5 Claims, 18 Drawing Figures

FIG. 16

| CONDITION | FIGURE | CLUTCH ENGAGEMENTS | | | | | GEARS IN USE | | | | |
|---|---|---|---|---|---|---|---|---|---|---|---|
| 1st Gear For. | 2 | 26 | 52 | 96 | 58 | 72 | 74 | 22/38 | 44/48 | 92/94 | | |
| 1st Gear Rev. | 3 | 28 | 52 | 96 | 58 | 72 | 74 | 24/38 | 44/48 | 92/94 | | |
| 2nd Gear For. | 4 | 26 | 52 | 102 | 58 | 72 | 74 | 22/38 | 44/48 | 98/100 | | |
| 2nd Gear Rev. | 5 | 28 | 52 | 102 | 58 | 72 | 74 | 24/38 | 44/48 | 98/100 | | |
| 3rd Gear For. | 6 | 28 | 50 | 96 | 58 | 72 | 74 | 24/34 | 42/46 | 92/94 | | |
| 3rd Gear Rev. | 7 | 26 | 50 | 96 | 58 | 72 | 74 | 22/34 | 42/46 | 92/94 | | |
| 4th Gear For. | 8 | 28 | 50 | 102 | 58 | 72 | 74 | 24/34 | 42/46 | 98/100 | | |
| 4th Gear Rev. | 9 | 26 | 50 | 102 | 58 | 72 | 74 | 22/34 | 42/46 | 98/100 | | |
| Reduction Hi. | 10 | 28 | 50 | 96 | 58 | | 90|88 | 24/34 | 42/46 | 92/94 | 82/86 | 80/84 |
| Reduction Low | 11 | 26 | 52 | 96 | 58 | | 90|88 | 22/38 | 44/48 | 92/94 | 82/86 | 80/84 |
| Pivot Rt. Turn | 12 | 26 | 52 | 96 | 58 | | 74 | 22/38 | 44/48 | 92/94 | | |
| Power Rt. Turn | 13 | 26 | 52 | 96 | 58 | 88 | 74 | 22/38 | 44/48 | 92/94 | | 80/84 |
| Left Spin Turn | 14 | 28 | 52 | 96 | 50 | 88 | 74 | 24/38-34 | 44/48 | 92/94 | 42/46 | 80/84 |
| Rt. Spin Turn | 15 | 26 | 52 | 96 | 50 | 88 | 74 | 22/38-34 | 44/48 | 92/94 | 42/46 | 80/84 |

4,117,744

TRANSMISSION FOR CRAWLER TRACTORS

BACKGROUND OF THE INVENTION

The present invention relates to a transmission for a track-laying vehicle and more particularly relates to a parallel cross shaft transmission including constant-mesh spur gear sets wherein a coupling or clutch is associated with each set for selectively establishing a driving connection between cross shafts associated with the set.

The prior art includes various crawler tractor transmissions including bevel gear reverser sections which are coupled to speed change sections including cross shafts carrying selectively engagable spur gear sets. Specifically in U.S. Pat. No. 2,746,319 issued to Gates on May 22, 1956, there is disclosed a reverser section which includes a single output shaft selectively coupled to an input shaft of the speed change section through means of a pair of selectively engageable spur gear sets. In addition to the speed change section, the Gates patent discloses a steering section including a differential gear set which operates to effect power-turning by causing one track to be driven at a slower speed than the other.

U.S. Pat. No. 3,056,310 issued to Ruf on Oct. 2, 1962, discloses a transmission including a reversing section coupled to two output shafts such that both output shafts may selectively be driven in the same direction or in opposite directions, the latter condition being effected for driving one of the vehicle tracks in one direction and the other vehicle track in the opposite direction to accomplish spin-turning.

U.S. Pat. No. 3,535,954 issued on Oct. 27, 1970 to Chambers et al discloses a reversing section for selectively driving a single output shaft in opposite directions, the output shaft being coupled to a pair of final drive-connected shafts through means of respective spur gear sets forming parts of planetary gearing carried by the output and final drive-connected shafts. The planetary gear sets of the transmission are selectively operable to effect steering conditions whereby the vehicle may be power-turned with one track driving slower than the other track, pivot-turned with one track dead and the other rotating or spin turned with one track rotating forwardly and the other rotating reversely. While the transmission illustrated in this patent operates to effect three different modes of steering and several ground speeds in forward or reverse, the means for accomplishing the same includes relatively elaborate planetary gear sets which are relatively costly.

SUMMARY OF THE INVENTION

According to the present invention, there is provided a novel transmission for a track-laying vehicle, the transmission including a bevel gear reversing section coupled to a change speed section including parallel transverse cross shaft assemblies interconnected by constant-mesh spur gear sets.

An object of the invention is to provide a multi-speed transmission of relatively simple construction for use in a track-laying vehicle, the transmission having the capabilities of (a) driving both tracks at a selected speed respectively in forward or reverse for straight travel, (b) selectively effecting three different steering modes by respectively driving both tracks in the same direction but at different speeds, by driving only one track at a time and by driving one track in one direction while driving the other track in the opposite direction and (c) driving the tracks under an increased torque condition for each selected speed.

A more specific object is to provide a transmission as described in the aforegoing paragraph including a first cross shaft assembly comprising a pair of shaft sections that are respectively connected to the reversing section of the transmission for being constantly driven in opposite directions relative to each other.

A further object of the invention is to provide a transmission including couplings for establishing selected driving connections between various shaft sections and between the parallel shaft assemblies, the actuation of the couplings being effected through an advantageously arranged control lever assembly which features the capability of shifting the transmission between High and Low range conditions without disturbing the drive speed gear selection.

These and other objects will become apparent from a reading of the ensuing description taken together with the appended drawings.

BRIEF DESCRIPTION OF THE DRAWINGS

FIG. 16 is a table relating to FIGS. 2-15 and showing the couplings and clutches engaged for each driving mode.

DESCRIPTION OF THE PREFERRED EMBODIMENT

Figure 1:
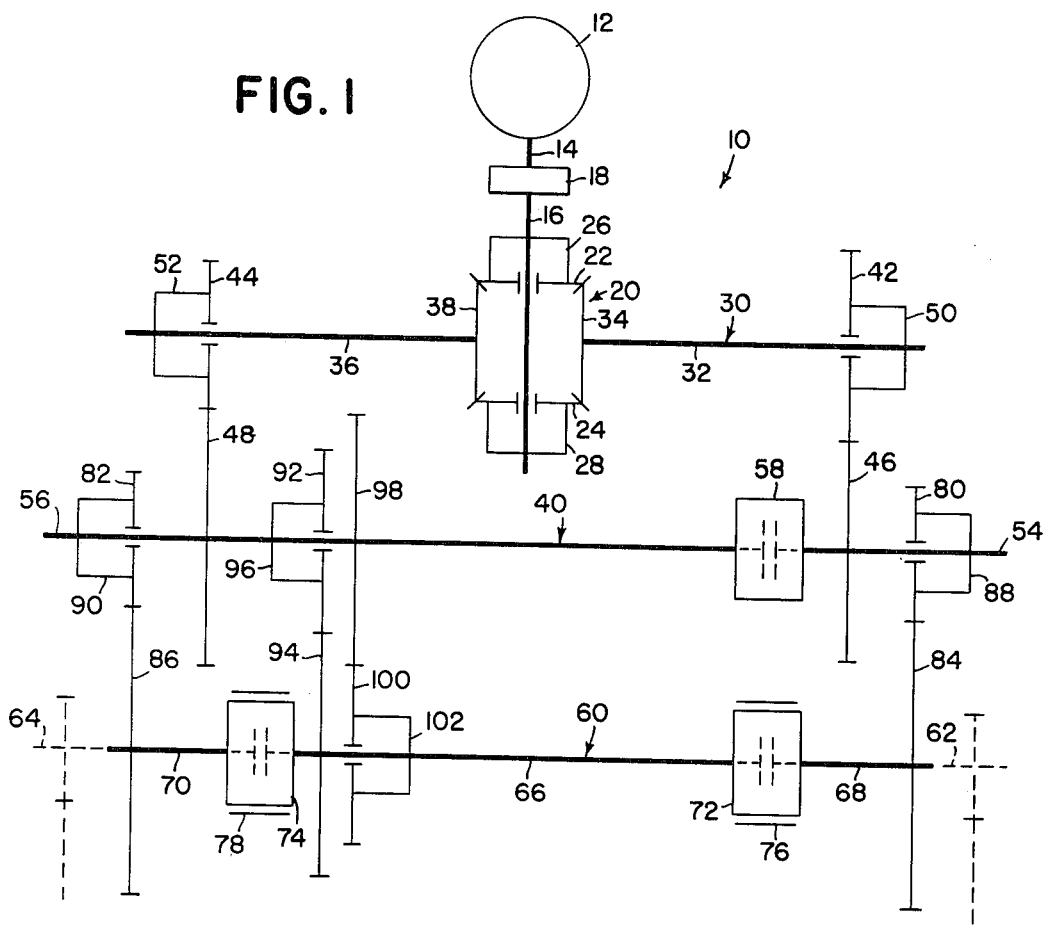
FIG. 1 is a schematic plan view of a transmission constructed according to the principles of the present invention.

Referring now to FIG. 1, therein is shown a power train generally indicated by the reference numeral 10 and including an internal combustion engine 12 having a fore-and-aft extending output shaft 14 connected to a drive shaft 16 through means of a torque converter 18. The drive shaft 16 provides the input for a bevel gear reverser section 20 including bevel gears 22 and 24 respectively, rotatably mounted on the shaft 16 at axially spaced locations with the gear 22 located between the gear 24 and the torque converter 18. Couplings or clutches 26 and 28 are respectively connected to the drive shaft 16 adjacent the gears 22 and 24 and are selectively operable to fix the gears 22 and 24 for rotation with the shaft 16. Forming an output of the reverser section 20 is a first cross shaft assembly 30 including, as viewed in FIG. 1, a shaft section 32 located rightwardly of the drive shaft 16 and having a bevel gear 34 fixed to its inner end and meshed with the bevel gears 22 and 24, and a shaft section 36 located leftwardly of the shaft 16 and having a bevel gear 38 fixed to its inner end and also meshed with the bevel gears 22 and 24. Thus, it will be appreciated that actuation of the coupling 26 will cause the shaft sections 32 and 36 to be rotated in opposite directions with these directions being reversed when the coupling 28 is actuated.

The first cross shaft assembly 30 is drivingly connected to a second or intermediate shaft assembly 40 through means of spur gears 42 and 44 respectively rotatably mounted on the outer ends of the shaft sections 32 and 36 and respectively meshed with spur gears 46 and 48 fixed to the cross shaft assembly 40. The spur gears 42 and 46 form a first gear set through which power flow may be selectively established by actuation of a coupling or clutch 50 fixed to the shaft section 32 and selectively engageable with the spur gear 42. Similarly, spur gears 44 and 48 form a second gear set through which power may flow from the shaft section 36 upon actuation of a coupling or clutch 52 fixed to the shaft 36 and selectively engageable with the spur gear 48. The second cross shaft assembly 40 is divided into right and left sections 54 and 56 respectively, coupled together by a coupling or clutch 58 located between the gear sets 42-46 and 44-48 at a position just leftwardly of the spur gear 46. Noteworthy is the fact that gears of the gear sets 42-46 and 44-48 are sized such that they are respectively operable to establish different drive ratios between the first cross shaft assembly 30 and the second cross shaft assembly 40 and to thereby establish High and Low working ranges in the transmission.

Extending parallel to the cross shaft assembly 40 is a final or third cross shaft assembly 60. Respectively coupled to the right and left ends of the cross shaft assembly 60 are right and left final drive assemblies 62 and 64 which are hereshown in dashed lines. The shaft assembly 60 includes intermediate, right and left shaft sections 66, 68 and 70, respectively. Extending between adjacent ends of the shaft sections 66 and 68 is a coupling or clutch 72 and extending between the adjacent ends of the shaft sections 66 and 70 is a coupling or clutch 74. Respectively associated with the couplings 72 and 74 are brakes 76 and 78.

Four different gear sets are provided for establishing respective driving connections between the second and third cross shaft assemblies 40 and 60, respectively with two of the gear sets acting as speed reduction sets and with the other two acting as speed selection sets. Specifically, rotatably mounted on the opposite ends of the cross shaft assembly 40 are right and left spur gears 80 and 82 which are respectively meshed with spur gears 84 and 86 respectively fixed to the shaft section 68 and 70. The gear sets 80-84 and 82-86 act as speed reduction sets which are respectfully operative when the transmission is in its High and Low working ranges. For establishing a driving connection through the gear set 80-84, there is provided a clutch or coupling 88 which is fixed to the right end of the shaft section 54 and selectively engageable for establishing a driving connection with the gear 80. Similarly, for establishing a driving connection through the gear set 82-86, there is provided a clutch or coupling 90 fixed to the left end of the shaft section 56 and selectively operable for establishing a driving connection with the spur gear 82. It is here noted that the gears of the gear sets 80-84 and 82-86 are of the same size so that the drive ratio established by the gear set 80-84 is the same as that established by the gear set 82-86.

One of the speed selection ger sets include a spur gear 92 rotatably mounted on the shaft section 56 of the shaft assembly 40 at a location just rightwardly of the spur gear 48, the gear 92 being meshed with a spur gear 94 fixed to the intermediate shaft section 66 at a location just rightwardly of the clutch or coupling 74. A driving connection is established through the spur gear set 92-94 by means of a clutch or coupling 96 fixed to the shaft section 56 and selectively operable to establish a driving connection with the spur gear 92. The other of the speed selection gear sets is located just rightwardly of the gear set 92-94 and it includes a spur gear 98 fixed on the shaft section 56 and meshed with a spur gear 100 rotatably mounted on the intermediate shaft section 66. For establishing a driving connection through the spur gear set 98-100, there is provided a clutch or coupling 102 fixed to the intermediate shaft section 66 and selectively operable for establishing a driving connection with the spur gear 100. It is here noted that gear 92 is bigger than gears 80 and 82 and gear 98 is bigger than gear 92, as shown in FIG. 1.

The various clutches or couplings described hereinabove may be of any known type but preferably are hydraulically actuatable. Except for couplings 58, 72 and 74, which are normally spring-engaged couplings, the couplings are normally spring-disengaged.

Figure 17:
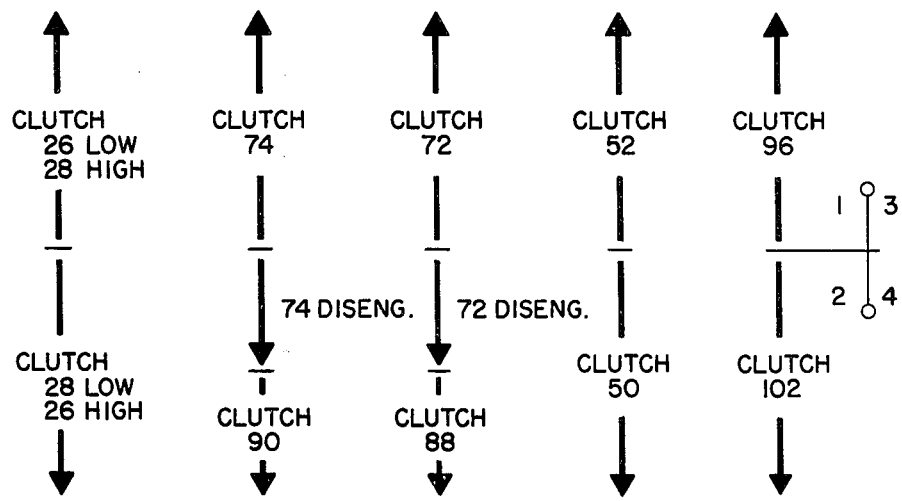
FIG. 17 is a schematic view of a lever arrangement which may be used for controlling the various couplings of the transmissions with indicia being associated with each lever for indicating the direction that each lever must be moved, relative to a neutral position, for effecting actuation of a certain coupling.
Figure 17:
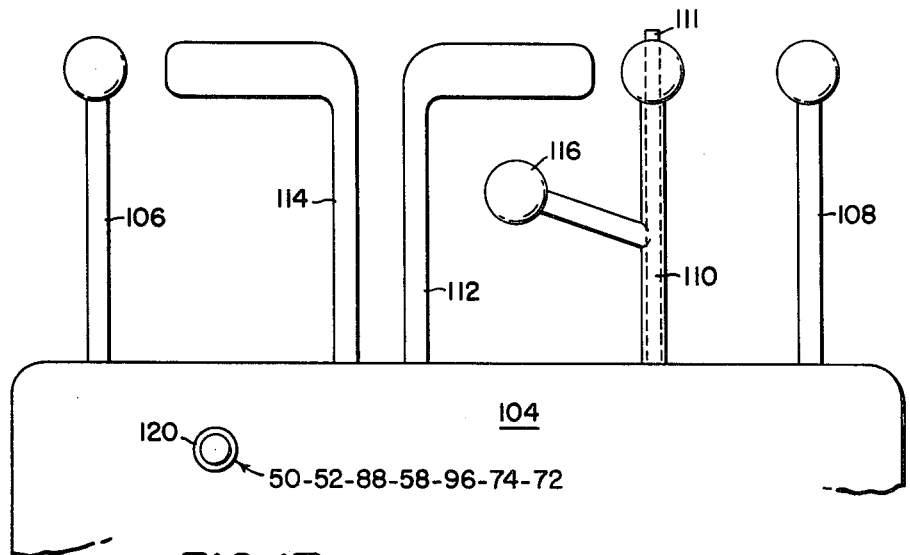
Figure 18:
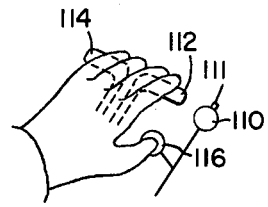
FIG. 18 is a view showing an operator's hand positioned for actuating three of the levers simultaneously.

Referring to FIGS. 17 and 18, there are shown various actuator levers projecting upwardly from within and an actuator button located in a surface of a console 104, the levers and button being connected to valving, in a manner not shown, for selected operation to effect actuation of the clutches or couplings described hereinabove. specifically, located at the left side of the console 104 is a direction control lever 106, which may be pushed forward or pulled rearwardly from a neutral position to respectively establish forward and rearward driving conditions in the transmission by effecting engagement of an appropriate one of the couplings 26 and 28 as determined by the positions of a further control lever described below.

Located at the right side of the console 104 is a speed control lever 108, which may be pushed forwardly or pulled rearwardly from a neutral position to respectively establish driving connections through the gear sets 92-94 and 98-100 by respective actuation of the couplings 96 and 102.

A range control lever 110 is located just leftwardly of the speed control lever 108 and may be pushed forwardly or pulled rearwardly from a neutral position to respectively establish Low and High range driving conditions by respectively establishing driving connections through the gear sets 44-48 and 42-46 by respective actuation of the couplings 52 and 50. It is here noted that the range control lever 110 cooperates with the direction control lever 106 for controlling the actuation of the couplings 26 and 28. Specifically, the lever 110 is mechanically linked, in a manner not shown, to valve elements which control the flow of fluid to the couplings 26 and 28 such that, when the lever 106 is in its forward position for establishing the forward driving condition in the transmission, shifting the lever 110 forwardly to actuate the Low range coupling 52 will also effect actuation of the coupling 26 while shifting the lever 110 rearwardly to actuate the High range coupling 50 will also effect actuation of the coupling 28. Similarly, when the lever 106 is in its rearward position for establishing the reverse driving condition in the transmission, shifting the lever 110 forwardly to actuate the Low range coupling 52 will also effect actuation of the coupling 28 while shifting the lever 110 rearwardly to actuate the High range coupling 50 will also effect actuation of the coupling 26. Projecting from the lever 110 is a normally extended, depressable button 111 which is connected, in a manner not shown, to the linkage for effecting control of the flow of actuating fluid to the couplings 26 and 28 so as to nullify the action of the linkage whereby when driving the tractor forwardly with the range control lever 110 in its forward Low range effecting position, the direction of travel of the tractor may be reversed and the speed increased by merely pulling the lever 110 back to its High range position, to effect disengagement of the coupling 52 and engagement of the coupling 50 while simultaneously depressing the button 111 so that clutch 26 remains engaged.

Right and Left steering-control levers 112 and 114, respectively, are located between the levers 106 and 110 and each of the levers 112 and 114 are mounted for movement among forward, intermediate and rear positions and they may be actuated with one hand (the left one) either separately or together. The lever 112 is connected to control the operation of the couplings 72 and 88 such that when the lever 112 is in its forward position, only the clutch 72 is engaged, when the lever 112 is in its intermediate position, both of the clutches 72 and 88 are disengaged and when the lever 112 is in its rearward position, only the clutch 88 is engaged. Similarly, the lever 114 is connected to control the operation of the couplings 74 and 90 such that when the lever 114 is in its forward position, only the clutch 74 is engaged, when the lever 114 is in its intermediate position, both of the clutches 74 and 90 are disengaged and when the lever 114 is in its rearward position, only the clutch 90 is engaged.

It is here noted that it may be desirable to change the range selection while steering the tractor and for this purpose a branch 116 exceeds from the range control lever 110 toward the right steering control lever 112 so that the lever 110 may be manipulated simultaneously with the control levers 112 and 114 by one hand of an operator, as illustrated in FIG. 18.

A spin-turn control button 120 is located in a surface, of the console 104, that would normally face a seated operator. The control button 120 is mechanically interconnected, in a manner not shown, to the various control levers heretofore described and when pushed is operable to override, if necessary, existing conditions of the transmission to establish a spin turn condition wherein the couplings 50, 52, 88, 96 and 74 are engaged.

The operation of the transmission 10 is as follows. Assuming the transmission to be in a neutral condition, the couplings 58, 72 and 74 will be in their respective normally spring-engaged conditions and the remaining couplings of the transmission will be in their normally spring-released conditions. If it is then desired to drive the vehicle in its first gear forward, the operator will push the direction and range control levers 106 and 110 forwardly to respectively effect engagement of the clutches 26 and 52 and will push the speed control 108 forwardly to effect engagement of the clutch 96. With the clutch 26 engaged, the shaft sections 36 and 32 of the first cross shaft assembly 30 will respectively be caused to rotate in forward and rearward directions respectively. The engagement of the clutch 52 causes the shaft assembly 40 to be driven from the shaft section 36 by way of the Low range gear set 44–48. With the clutch 96 engaged, the rotation of the shaft section 56 will be transferred, by way of the speed gear set 92–94, to the intermediate shaft section 66 of the cross shaft assembly 60. As clutches 72 and 74 are engaged, the shaft sections 68 and 70 are connected for rotation with the shaft section 66. The condition of the transmission is then that illustrated in FIG. 2.

Figure 3:
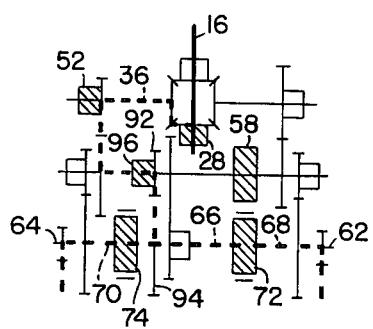

A first gear reverse driving condition can be established in a manner similar to that for first gear forward except that instead of being moved forwardly, the initial movement of the direction control lever 106 from its neutral position is rearwardly. This effects engagement of the clutch 28 and causes the shaft sections 36 and 32 to be respectively driven in the rearward and forward directions. The condition of the transmission 10 is then that illustrated in FIG. 3.

Figure 4:
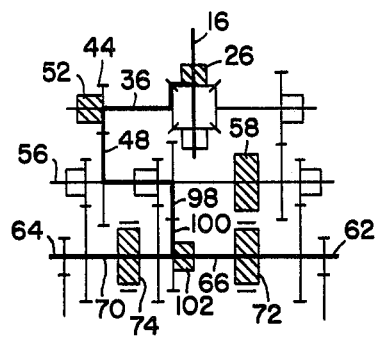
Figure 5:
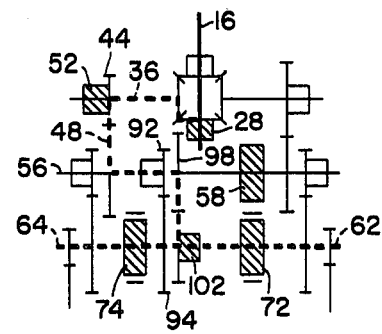

The transmission may be shifted from its first speed forward condition to a second speed forward condition by merely moving the speed control lever 108 from its forward to its rearward position. This movement disengages clutch 96 and then engages clutch 102 so as to effect a driving condition between the shaft sections 56 and 66 by way of the spur gears 98 and 100. This condition of the transmission is illustrated in FIG. 4. A second speed reverse condition, as illustrated in FIG. 5, can then be established in the transmission 10 by shifting the direction control lever 106 from its forward to its rearward position to effect disengagement of the clutch 26 and engagement of the clutch 28.

Figure 6:
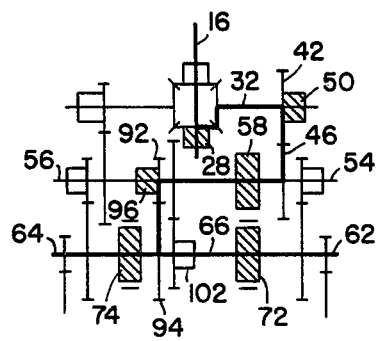
Figure 7:
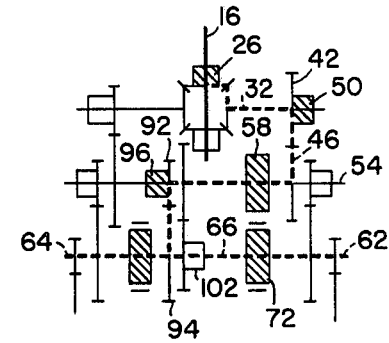

A third forward driving speed is obtainable by placing the direction control lever 106 in its forward position, by placing the speed control lever 108 in its forward position and by placing the range control lever 110 in its rearward High range position, the placement of these levers respectively effecting engagement of the clutch 28, the clutch 50 and the clutch 96. Thus, the shaft section 32 is driven in its forward direction and is connected to the shaft section 54 by means of the High range gear set 42–46. The normally engaged coupling 58 serves to cause the shaft section 56 to be driven with the shaft section 54, the intermediate shaft section 66 then being driven by the shaft section 56 by way of the speed gear set 92–94. As clutches 72 and 74 are engaged, the shaft sections 68 and 70 are connected for rotation with the shift section 66. The condition of the transmission when in its third gear forward condition is illustrated in FIG. 6. To then shift the transmission from its third gear forward position to its third gear reverse condition, it is necessary to only move the shift lever 106 from its forward position to its rearward position to effect disengagement of the clutch 26 and engagement of the clutch 28 of the reverser section 20 to thereby reverse the direction of rotation of the shaft section 32. The third gear reverse condition of the transmission 10 is illustrated in FIG. 7.

Figure 8:
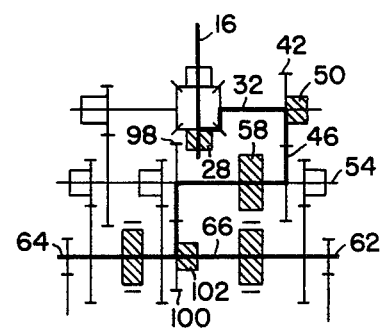
Figure 9:
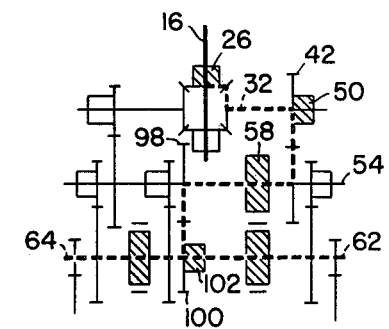

The transmission may be shifted from its third gear forward condition to its fourth gear forward condition by merely moving the speed control lever 108 from its forward to its rearward position to effect disengagement of the clutch 96 and engagement of the clutch 102. The shaft assembly 60 is then driven from the shaft assembly 40 by way of the speed gear set 98–100. The fourth gear forward condition of the transmission is illustrated in FIG. 8. To shift to a fourth gear reverse condition from the fourth gear forward condition, it is necessary only for the operator to move the direction control lever 106 from its forward to its rearward position to effect disengagement of the clutch 28 and engagement of the clutch 26 so as to cause the shaft section 32 to be changed from its forward to its rearward direction of rotation.

Figure 10:
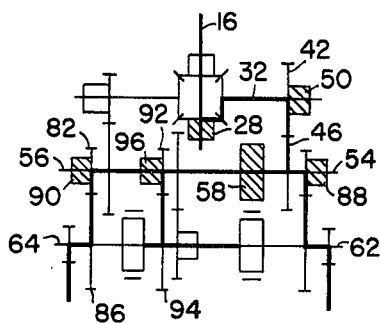
Figure 11:
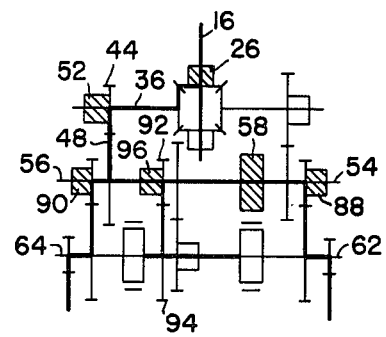

In the event that a working tool carried by the tractor should encounter a "hard" spot, the operator can compensate for the additional load without adjusting the tool by merely pulling both steering levers 112 and 114 from their respective forward to their respective rearward positions. Specifically, when the steering levers are moved from their forward to their rearward positions, they effect disengagement of the clutches 72 and 74 and engagement of the clutches 88 and 90. Thus, a driving condition is established between the cross shaft assembly 40 and the shaft section 68 by way of the speed reduction gear set 80-84 and with the shaft section 70 by way of the speed reduction gear set 82-86. It will be appreciated then that if the transmission is in its Low driving range, first gear for example, power flow therethrough, after pulling back on levers 112 and 114 will be as illustrated in FIG. 11, and if the transmission is in its High driving range, third gear for example, power flow therethrough, after pulling back on the levers 112 and 114, will be as illustrated in FIG. 10. It will also be appreciated that if the load is still too great when the transmission is in its High range reduction drive condition (FIG. 10) the operator need only to push the range control lever forwardly to its Low range position by engaging his thumb with the branch 116 as illustrated in FIG. 18. The Low reduction drive condition of FIG. 11 will then be established in the transmission. These driving conditions can be established in reverse by merely pulling the direction control lever 106 to its rearward position.

Figure 2:
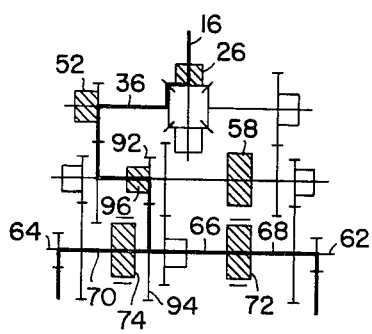
FIGS. 2-15 show the various paths of power flow through the transmission which may be accomplished by selectively actuating different combinations of the couplings between the shaft sections and between the shafts and the gear sets, with the paths for forward driving modes indicated in solid lines and with the paths for reverse driving modes indicated by dashed lines.
Figure 12:
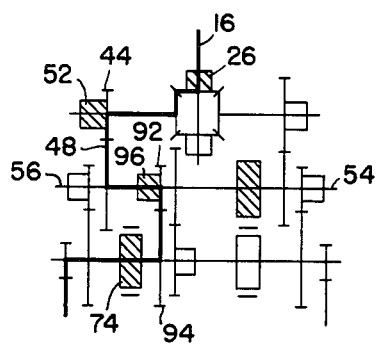
Figure 13:
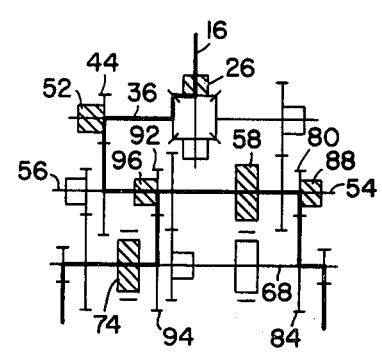

With the transmission in its first gear forward condition illustrated in FIG. 2, a right pivot-turn can be effected by moving the right steering lever 112 from its forward position to its intermediate position to effect disengagement, of the clutch 72 resulting in the shaft section 68 being disconnected from the intermediate shaft section 66. The power flow is then as illustrated in FIG. 12. To prevent the right track from rotating and to cause the tractor to pivot about the center of the right track the operator may apply the brake 76. If it is then desired to turn the vehicle back to the left without disconnecting power flow to the left drive track it is necessary only to pull the right steering lever 112 from its intermediate to its rearward position so as to effect engagement of the clutch 88 so as to establish a driving connection between the shaft section 54 and the shaft section 68 by way of the speed reduction gear set 80-84.

Figure 14:
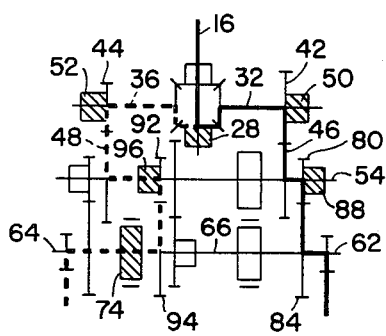
Figure 15:
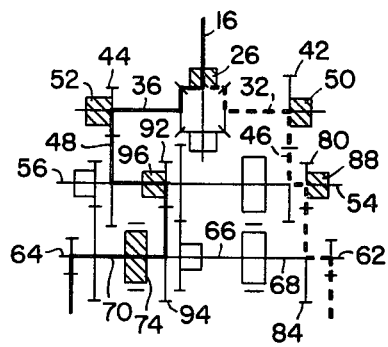

The transmission may be prepared for effecting a spin-turn by actuating the spin-turn control button 120. Such actuation effects simultaneous engagement of the couplings 50, 52, 88, 96 and 74 and disengagement of the couplings 58 and 72, regardless in what positions the various control levers are. Left or right spin-turns may then be accomplished by respectively moving the direction control lever 106 either forwardly or rearwardly from its neutral position for respectively effecting engagement of either the coupling 28 or the coupling 26 to thereby respectively establish either the transmission condition illustrated in FIG. 14, wherein the right final drive assembly 62 is driven forwardly while the left final drive 64 assembly is driven in reverse, or the transmission condition illustrated in FIG. 15 wherein the left final drive assembly 64 is driven forwardly while the right final drive assembly 62 is driven in reverse.

Thus, it will be appreciated that the transmission 10 may be placed in various operating conditions including Low and High range driving conditions with two speeds possible in each range and with a speed reduction being possible in each range, these conditions being possible in both forward and reverse travel. Further, it will be appreciated that the transmission may be controlled for effecting various types of turns including pivot turns with one track under power and the other free or braked, power-turns with both tracks under power in the same direction but at different speeds and spin-turns with both tracks counter rotating at the same speed.

I claim:

1. A transmission for driving the opposite tracks of a track laying vehicle, comprising: an input shaft; a first shaft assembly arranged crosswise to and including first and second shaft sections located in axial alignment with each other and on opposite sides of the input shaft; a controllable reversing gear means connected between the input shaft and the first and second shaft sections for selectively driving the first shaft section in opposite directions while simultaneously driving the second shaft section oppositely to the first shaft section; a further shaft assembly arranged parallel to the first shaft assembly and including first and second axially aligned final drive input shaft sections; and first selectively engageable drive means connected between the first shaft section and first final drive input shaft section for establishing a drive connection between the first shaft section and the first final drive input shaft section and second selectively engageable drive means connected between the second shaft section and second final drive input shaft section for establishing a drive connection between the second shaft section and the second final drive input shaft section whereby simultaneous engagement of the first and second drive means will effect opposite rotation of the final drive input shaft sections and separate engagements of the first and second drive means will effect rotation of a selected one of the final drive input shaft sections.

2. The transmission defined in claim 1 wherein said first selectively engageable drive means includes a first intermediate shaft section located between the first shaft section and first final drive input shaft section, first and second inter-meshed spur gears respectively rotatably mounted and fixedly mounted on one and the other of the first shaft section annd first intermediate input shaft section; third and fourth inter-meshed spur gears respectively rotatably mounted and fixedly mounted on one and the other of the first intermediate section and first final drive input shaft sections; first and second selectively operable clutch means respectively coupled between the first spur and said one of the first shaft section and first intermediate shaft section and between the third spur gear and said one of the first intermediate shaft section and first final drive input shaft section; said second selectively engageable drive means including a second intermediate shaft section located between the second shaft section and second final drive input shaft section; fifth and sixth inter-meshed spur gears respectively rotatably mounted and fixedly mounted on one and the other of the second shaft section and second intermediate shaft section; seventh and eighth inter-meshed spur gears respectively rotatably mounted and fixedly mounted on one and the other of the second intermediate shaft section and second final drive input shaft section; and third and fourth selectively engageable clutch means respectively connected between the fifth spur gear and the one of the second shaft section and second intermediate shaft section and between the seventh spur gear and the one of the second intermediate shaft section and the second final drive input shaft section.

3. The transmission defined in claim 2 wherein the first and second intermediate shaft sections are axially aligned; and a fifth selectively operable clutch means being connected between the first and second intermediate shaft sections.

4. The transmission defined in claim 3 and further including a central final drive input shaft section disposed in axial alignment with the first and second final drive input shaft sections; and sixth and seventh selectively operable clutch means respectively connected between the central and first final drive input shaft section and between the central and second final drive input shaft sections.

5. The transmission defined in claim 4 and further including ninth and tenth inter-meshed spur gears respectively rotatably mounted and fixedly mounted on one and the other of the second intermediate shaft section and the central final drive input shaft section; eleventh and twelfth inter-meshed spur gears respectively rotatably mounted on and fixedly mounted on one and the other of the second intermediate shaft section and second final drive shaft section; and eighth and ninth selectively operable clutch means respectively connected between the ninth spur gear and the one of the one of the other second intermediate shaft section and the central final drive input section and between the eleventh spur gear and the one of the one and the other of the second intermediate shaft section and the central final drive input shaft section.

* * * * *